C. L. BAIR.
VEHICLE BOW TOP HOLDER.
APPLICATION FILED FEB. 21, 1917.
1,311,370.
Patented July 29, 1919.
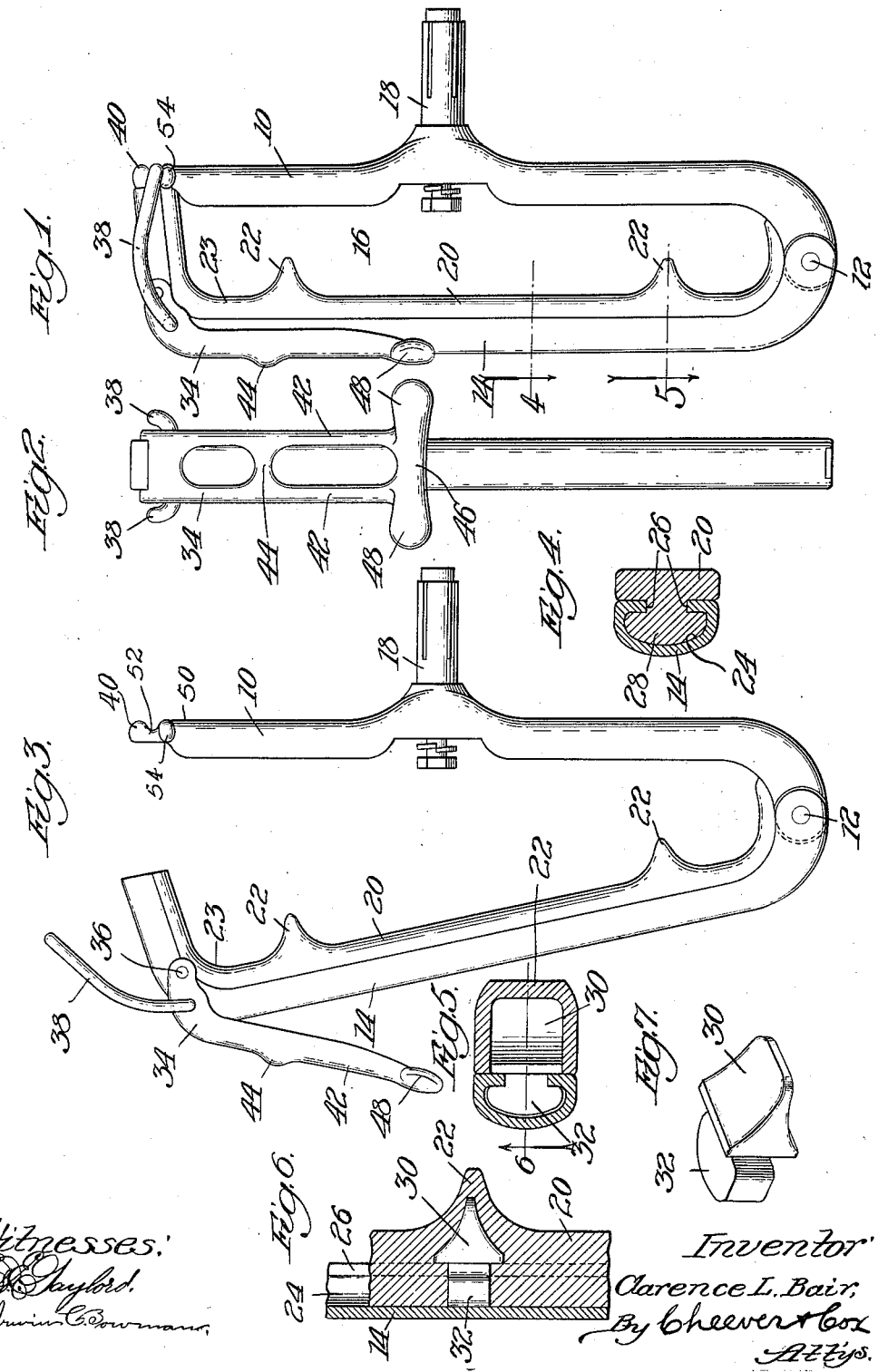

UNITED STATES PATENT OFFICE.

CLARENCE L. BAIR, OF ST. JOSEPH, MICHIGAN, ASSIGNOR TO AUTO SPECIALTIES MANUFACTURING CO., OF ST. JOSEPH, MICHIGAN, A CORPORATION OF CALIFORNIA.

VEHICLE BOW TOP HOLDER.

1,311,370.      Specification of Letters Patent.     Patented July 29, 1919.

Application filed February 21, 1917. Serial No. 150,068.

*To all whom it may concern:*

Be it known that I, CLARENCE L. BAIR, a citizen of the United States, residing at St. Joseph, in the county of Berrien and State of Michigan, have invented a certain new and useful Improvement in Vehicle Bow Top Holders, of which the following is a specification.

This invention relates to vehicle bow top holders now in common use, one form of which is shown in my prior Patent Number 1,010,110.

The object of this invention is to provide such a bow holder with a novel meals of attaching the rubber cushion to the metal of the bow, and at the same time affording invisible metallic reinforcement for the lifts in the rubber cushion, preferably making said lifts adjustable lengthwise of the metallic body of the bow holder to accommodate rubber cushions having different spaced lifts. A further object of the invention is to provide means for preventing the locking link from slipping too far down the stock so that it cannot be broken.

The invention consists in a device capable of carrying out the foregoing objects, which can be easily and cheaply made, which is satisfactory in operation and not readily liable to get out of order. It further consists in the features and details of construction which will be hereafter more fully set forth in the specification and claims.

Referring to the drawings, in which similar numerals indicate the same parts throughout the several views, Figure 1 is a front, and Fig. 2 a side view of mechanism illustrating this invention in its preferred form, the parts thereof being in closed position or in that position which they will assume when embracing the bows of a vehicle top.

Fig. 3 is a changed position view of the device of Fig. 1, showing the bow holder open ready to admit the bows of the vehicle top.

Fig. 4 is a sectional detail plan view on the line 4 of Fig. 1.

Fig. 5 is a sectional detail plan view on the line 5 of Fig. 1.

Fig. 6 is a sectional detail front view on the line 6 of Fig. 5.

Fig. 7 is a perspective view of a detachable metallic lift support.

As is well understood in the art, the bow separator itself comprises a stock member 10 having pivoted to it at 12 a swinging arm 14 securable at its top to the stock by the mechanism hereafter described, there being between the stock and arm an elongated space 16 within which the bows (not shown) of the top of the vehicle to which the device is applied are adapted, when folded down, to rest and be secured by the device against jumping, rubbing and chafing.

The holder is detachably securable to the vehicle body by the mechanism 18, or any other suitable mechanism for the purpose, the same forming no part of the invention of this application, and therefore, not described in detail.

Modern practice requires that the arm 14 be lined with a rubber cushion 20, and that this rubber cushion be provided along its length with one or more bow lifts 22 adapted as the arm 14 is closed to lift the adjacent bow of the top into concave recess 23 which is the real bow separator. One problem of this invention is to provide means for readily attaching this rubber cushion member 20 to the arm 14 in such a way it can be readily detached for repair or replacement, and to provide means for reinforcing with an invisible metal support the rubber lifts 22; this latter in combination with means whereby the reinforcing means are adjustable to rubber cushions having differently spaced lifts 22 to accommodate different sizes of vehicle top bows.

The first part of this problem just described is solved by constructing the arm 14 with a longitudinal recess or chamber 24 extending along the arm 14 as far as any rubber cushion 20 is required, access to this chamber being had through an elongated slot 26 of less width than the chamber, opening toward the space 16, heretofore referred to, and by correspondingly constructing the rubber cushion 20 with a longitudinally extending rib 28 of a shape to, as shown in Fig. 4, be pressed through the slot 26 and into the chamber 24, thus retaining the rubber cushion 20 against the arm 14 throughout the entire length of the rubber cushion.

The second part of the problem is solved by recessing the rear surface of the cushion 20 under the lifts 22 for the insertion therein of metallic brace members 30, which are of such a size and shape that they are entirely concealed within the lifts 22. The members 30 are supported upon elongated button members 32 of such a size and shape that they may be passed through the slot 26 in the arm 14 and then given a quarter turn into the position of Figs. 5 and 6 where they obviously prevent removal of the device 30, 32 from the arm. The fit of these button members 32 in chamber 24 is such that the supports 30 may be moved longitudinally of the arm as may be required to bring them into engagement with differently positioned bow lifts 22 on different cushions 20.

If only rubber cushions 20 with lifts 22 spaced in one definite relation are to be used in the bow holder, the reinforcing metallic members 30 may be cast integral with the arm 14 without departing from this invention.

In assembling the parts, the operator takes the arm 14 with the metallic members 30 therefor and, if they are adjustable as last indicated, moves them to the proper position to receive the cushion 20. He now places the cushion 20 adjacent to the arm with the lifts 22 of the cushion over the metallic members 30 and, by applying pressure, forces the enlarged rib 28 of the cushion 20 through the slot 26 into the chamber 24 until the parts assume the normal position shown in the drawing.

The locking mechanism for securing the arm 14 to the stock 10 comprises a lever 34 pivoted at 36 and provided with a link 38 which embraces a specially formed upper end portion 40 of stock 10. The second general object of the invention is accomplished by making this lever member 34 essentially of two parallel members 42, adapted, when the device is in the position of Figs. 1 and 2, to lie closely upon the sides of the arm 14 instead of directly upon the back of it as has heretofore been the practice, these two members 42 being merely connected together for unity by a relatively thin band 44 across their middle portion and a flat thin band 46 at their ends, connecting the usual finger holds 48. By this construction the lever closely conforms to the back of the arm 14 and is not so likely to be in the way and have things catch upon it as with devices of this character in the prior art.

As is made clear by the foregoing specification, the stock 10 is fixed, while the arm 14 carrying the locking mechanism, swings with reference thereto, the link 38 passing over and locking in notch or bearing 52 upon a specially formed upper end portion 40 of stock 10, said notch opening rearwardly of the stock, as shown. The lever member 34 operated on fulcrum point or pivot 36 creates a powerful pressure upon the link 38 to stretch it and thus hold the stock and arm together. As the parts are all of metal, it is essential, in order to avoid breaking of the link 38, that all the parts be in proper position, shown in Fig. 1, when this stretching operation takes place. As the link 36 is made of parallel bars, as shown (see Fig. 2), somewhat wider than the normal thickness of the stock 10, there is danger, under ordinary conditions, of the link 38 slipping downward on the stock 10 to a point, say, 50, instead of resting in the notch 52, formed in the member 40, heretofore described, and if the link 38 should so drop down to 50 and then closing pressure be exerted on the lever 34, the link 38 would be unduly strained, with the result of breaking either the link 38 or lever 34 or attached parts. This difficulty is overcome by placing on at least one side of the stock 10, preferably on both, a projecting stop member 54 of sufficient length as to always engage the link member 38 and effectually prevent any part of the link moving down the stock beyond this stop, or the pair of stops if they are on both sides.

The described advantages of using the member 54 as a stop to prevent the descent of member 34 are fully set forth, described, and claimed in my divisional application Serial No. 303,354.

Having thus described my invention, what I claim as new and desire to secure by Letters Patent, is:

1. In a device of the class described, a rigid arm, a strip of cushion material extending along and attached to said arm, bow lifts of cushion material projecting from the cushion at points intermediate of its length away from the arm, and non-compressible supports rising from the arm passing through the body of the cushion proper and into the bow cushion material lifts but entirely concealed within said cushion material, for the purposes set forth.

2. A relatively narrow and long arm, rigid support members projecting from the arm, and a strip of cushion material adjacent to the arm, there being on said cushion material bow lifts which are recessed so as to be internally supported by said projecting members on the arm, and interlocking parts on the arm and cushion material between the bow lifts securing the cushion to the arm.

3. In a device of the class described, a rigid arm, a strip of cushion material extending along and attached to said arm, bow lifts of cushion material projecting from the cushion at points intermediate of its length away from the arm, non-compressible supports rising from the arm passing through the body of the cushion proper and into the bow lifts thereon, and means adjustably mounting the non-compressible supports at different points along the length of the arm whereby strips of cushion material with differently spaced bow lifts thereon may be selectively applied to the arm.

4. In a device of the class described, a rigid arm, a strip of cushion material extending along and attached to said arm, bow lifts of cushion material projecting from the cushion at points intermediate of its length away from the arm, non-compressible supports rising from the arm passing through the body of the cushion proper and into the bow lifts thereon, and means adjustably mounting the non-compressible supports at different points along the length of the arm whereby strips of cushion material with differently spaced bow lifts thereon may be selectively applied to the arm, the attaching means for both the cushion and non-compressible supports comprising suitably formed parts thereon respectively entering an elongated slot, in the face of the rigid arm, opening into a wider elongated recess extending along the length of the arm.

In witness whereof, I have hereunto subscribed my name in the presence of two witnesses.

CLARENCE L. BAIR.

Witnesses:
DWIGHT B. CHEEVER,
M. S. ROSENZWEIG.